(12) United States Patent
Vladuchick et al.

(10) Patent No.: US 11,605,515 B2
(45) Date of Patent: Mar. 14, 2023

(54) INTEGRATED TANK FOOT PARTICLE TRAP

(71) Applicant: Hitachi Energy Switzerland AG, Baden (CH)

(72) Inventors: Paul Jason Vladuchick, Cranberry Township, PA (US); Elizabeth Ballard, Sewickley, PA (US); Jared P. Johnston, Greensburg, PA (US)

(73) Assignee: Hitachi Energy Switzerland AG, Baden (CH)

( * ) Notice: Subject to any disclaimer, the term of this patent is extended or adjusted under 35 U.S.C. 154(b) by 0 days.

(21) Appl. No.: 17/419,136

(22) PCT Filed: Dec. 18, 2019

(86) PCT No.: PCT/US2019/067199
§ 371 (c)(1),
(2) Date: Jun. 28, 2021

(87) PCT Pub. No.: WO2020/142217
PCT Pub. Date: Jul. 9, 2020

(65) Prior Publication Data
US 2021/0407750 A1    Dec. 30, 2021

Related U.S. Application Data

(60) Provisional application No. 62/786,706, filed on Dec. 31, 2018.

(51) Int. Cl.
H01H 33/56     (2006.01)
H02G 5/06      (2006.01)

(52) U.S. Cl.
CPC .......... H01H 33/561 (2013.01); H02G 5/065 (2013.01)

(58) Field of Classification Search
CPC .. H01H 33/561; H01H 33/56; H01H 33/6683; H01H 2033/567; H02G 5/065;
(Continued)

(56) References Cited

U.S. PATENT DOCUMENTS 6,307,172 B1 * 10/2001 Bolin ..................... H01H 33/56
                                                                218/43
7,102,101 B1    9/2006 Johnson et al.
(Continued)

FOREIGN PATENT DOCUMENTS

CN     202134449 U    2/2012
EP     1761983 A1     3/2007
(Continued)

OTHER PUBLICATIONS

International Search Report and Written Opinion of the International Searching Authority, PCT/US2019/067199, dated Mar. 30, 2020, 8 pages.
(Continued)

Primary Examiner — William A Bolton
(74) Attorney, Agent, or Firm — Sage Patent Group (57) ABSTRACT

An enclosure for a circuit breaker that includes a particle trap that is integrated into at least one foot of the enclosure. The enclosure can be configured to house a circuit interrupter and seal a dielectric insulating medium within an interior region of the enclosure. The particle trap can include an opening that extends through at least an inner side of a wall of the enclosure and into an adjacent foot such that the opening is in fluid communication with the interior region of the enclosure. Additionally, the opening of the particle trap can radially extend within both the wall of the enclosure and the foot between a first side and a second side of the particle trap.

19 Claims, 5 Drawing Sheets

(58) Field of Classification Search
 CPC .. H02B 13/02; H02B 13/035; H02B 13/0354; H02B 13/045
 USPC .... 218/84, 79, 80, 78, 97; 174/28, 14 R, 27; 361/603
 See application file for complete search history.

(56) References Cited

U.S. PATENT DOCUMENTS

| | | | | |
|---|---|---|---|---|
| 7,858,877 | B2* | 12/2010 | Nowakowski | ......... H02G 5/065 |
| | | | | 218/155 |
| 8,546,687 | B2* | 10/2013 | Tsurimoto | .............. H02G 5/065 |
| | | | | 174/28 |
| 9,190,232 | B2 | 11/2015 | Abe et al. | |
| 9,595,409 | B2 | 3/2017 | Vladuchick et al. | |
| 9,799,472 | B1* | 10/2017 | Hermosillo | ............ H02G 5/065 |
| 9,972,987 | B2* | 5/2018 | Nakauchi | ............... H02G 5/063 |
| 10,043,621 | B2* | 8/2018 | Kainaga | ................. H02G 5/065 |
| 2008/0290739 | A1 | 11/2008 | Nowakowski et al. | |
| 2018/0075990 | A1 | 3/2018 | Vladuchick et al. | |
| 2018/0190453 | A1* | 7/2018 | Daehler | ................. H01H 11/00 |

FOREIGN PATENT DOCUMENTS

| | | |
|---|---|---|
| JP | S56-108326 U | 8/1981 |
| JP | H06-119853 A | 4/1994 |
| JP | 2002-051415 A | 2/2002 |
| WO | WO 2017/007602 A1 | 1/2017 |
| WO | WO 2017/125333 A1 | 7/2017 |

OTHER PUBLICATIONS

First Office Action, Indian Patent Application No. 202147028936, dated Sep. 20, 2021, 7 pages.
First Office Action, Japanese Patent Application No. 2021-538316, dated Aug. 16, 2022, 8 pages.
Supplementary Partial European Search Report, European Patent Application No. EP19907412.1, dated Nov. 23, 2022, 9 pages.

* cited by examiner

INTEGRATED TANK FOOT PARTICLE TRAP

CROSS REFERENCE TO RELATED APPLICATIONS

This application is a 35 U.S.C. § 371 national stage application of PCT International Application No. PCT/US2019/067199 filed on Dec. 18, 2019, which in turns claims domestic priority to U.S. Provisional Patent Application No. 62/786,706, filed on Dec. 31, 2018, the disclosures and content of which are incorporated by reference herein in their entirety.

FIELD OF INVENTION

Embodiments of the present application generally relate to particle traps in enclosures for circuit breakers. More particularly, but not exclusively, embodiments of the present invention relate to particle traps that are incorporated into the tank foot structure in gas-sealed enclosures for circuit breakers.

BACKGROUND

Various types of circuit breakers used to selectively open and close electrical connections utilize a sealed enclosure or tank that is filled with a liquid or gaseous dielectric insulating medium, including, for example, sulfur hexafluoride ($SF_6$), among other insulating gases and liquids. The dielectric insulating medium within the sealed enclosure can be used in at least an attempt to reduce and/or quench arcing, as well as prevent the flow of electrical current from electrically active pans and at least the enclosure, that can be associated with the operation of contact of the circuit breaker that is housed within the sealed enclosure. For example, such insulating mediums can be used to prevent arcing that can be associated with the displacement of a moveable contact relative to a stationary contact of a circuit interrupter within the interior region of the enclosure.

In at least certain situations, the enclosure of an assembled circuit breaker can contain undesirable foreign particles, including, for example, metal shavings from machined parts, dirt, and/or debris that can generated at least during assembly or operation of the circuit breaker, among other contaminants. Yet, such contaminants within the enclosure can interfere with the operation of the circuit breaker. For example, such contaminants, and in particular metallic contaminants, can cause undue arcing and/or flashing, as well as be electrically charged, and can radially reciprocate within the tank, which can at least contribute to reducing the breakdown voltage of the circuit breaker.

Traditionally, enclosures having internal particle traps have been configured such that a portion of a wall of the enclosure that provides the particle trap is outwardly extended at the location of the particle trap. Moreover, the particle trap can be a recessed groove or trough in the wall of the enclosure. However, in order to accommodate the recessed trough of the particle trap, at least a portion of the outer wall of the enclosure at, and adjacent to, the recessed trough generally extends in an outward direction relative to at least other generally adjacent portions of the wall. Thus, the outer side of the portion of the wall of the enclosure that provides, and/or is around, the particle trap can generally provide an outward projection that interrupts the generally linearly extending adjacent portions of the outer side of the wall. Such a projection(s) can interfere with the placement of equipment related to the enclosure and/or circuit breaker. For example, often a heater is positioned generally adjacent to the outer side of the wall of the enclosure. However, such outwardly extending projections can interfere with the placement of such heaters. For example, with respect to such a projection that is located at a center location along a bottom side of the enclosure, for relatively long heaters the projection(s) can limit or interfere with how close the heater can be to positioned to other generally linear portions of the outer side of the wall that are on opposing sides of the projection(s) Alternatively, relatively shorter heaters could be placed on either side of the projection(s) so that the heaters can be placed, without interference from the projection(s), in relatively closer proximity to adjacent generally linear portions of the outer side of the wall. Yet, such a solution requires multiple heaters and associated additional components, as well as can increase the complexity of insulation of the circuit breaker.

Additionally, given at least the relative thinness of the wall of the enclosure, the internal pressures that can be attained within the enclosure in connection with at least with operation of the circuit breaker, and/or concerns relating to discontinuities in the casting of the enclosure, outward projections in the enclosure that are configured to accommodate particle traps often are accompanied by the additional design and formation of reinforcements in the enclosure. Additionally, with respect to enclosures that are formed by a casting process, the change in the direction of flow that material used to cast the enclosure can experience when casting the recessed trough for the particle trap and associated outward projection of the enclosure can contribute to discontinuities in the cast material Yet, attempts to address such discontinuities or voids by strengthening the portion of the wall of the enclosure that contains, or is around, the particle trap can increase the complexity of the mold, and require the inclusion of additional material.

BRIEF SUMMARY

An aspect of an embodiment of the present application is an apparatus that includes an enclosure having a wall and a plurality of feet. The wall includes an inner side that generally defines an interior region of the enclosure. The plurality of feet can extend outwardly from, and radially about, at least a portion of the wall. The apparatus further can include a particle trap having an opening in at least one foot of the plurality of feet. The opening of the particle trap can (i) outwardly extend between a first end and a second end of the particle trap, and (ii) radially extend between a first side and a second side of the particle trap. Additionally, the first end of the particle trap is at the inner side of the wall of the enclosure and the second end of the particle trap is within the at least one foot.

Another aspect of the present application is an apparatus that includes an enclosure having a wall and a plurality of feet. The wall can have an inner side that generally defines an interior region of the enclosure. The plurality of feet can extend outwardly from, and radially about, at least a portion of the wall. Further, each foot of the plurality of feet can include a particle trap, each of the particle traps having an opening that can (i) extend through the wall of the enclosure and into the foot such that the opening is in fluid communication with the interior region of the enclosure, and (ii) radially extend within both the wall and the foot between a first side and a second side of the particle trap.

Additionally, an aspect of the present application is a circuit breaker that includes at least one pole assembly having a first electrical conductor, a second electrical conductor, an enclosure, and a circuit interrupter. The enclosure can include a wall and a plurality of feet, the wall having an inner side that defines an interior region of the enclosure. The circuit interrupter can be housed within the interior region of the enclosure. Each foot of the plurality of feet can include a particle trap, the particle trap having an opening that (i) extends through the wall of the enclosure and into the foot such that the opening is in fluid communication with the interior region of the enclosure, and (ii) radially extends within both the wall and the foot between a first side and a second side of the particle trap.

These and other aspects of the present invention will be better understood in view of the drawings and following detailed description.

BRIEF DESCRIPTION OF THE DRAWINGS

The description herein makes reference to the accompanying figures wherein like reference numerals refer to like parts throughout the several views.

The foregoing summary, as well as the following detailed description of certain embodiments of the present application, will be better understood when read in conjunction with the appended drawings. For the purpose of illustrating the application, there is shown in the drawings, certain embodiments. It should be understood, however, that the present application is not limited to the arrangements and instrumentalities shown in the attached drawings. Further, like numbers in the respective figures indicate like or comparable parts.

DESCRIPTION OF THE ILLUSTRATED EMBODIMENTS

Certain terminology is used in the foregoing description for convenience and is not intended to be limiting. Words such as "upper," "lower," "top," "bottom," "first," and "second" designate directions in the drawings to which reference is made. This terminology includes the words specifically noted above, derivatives thereof, and words of similar import. Additionally, the words "a" and "one" are defined as including one or more of the referenced item unless specifically noted. The phrase "at least one of" followed by a list of two or more items, such as "A, B or C," means any individual one of A, B or C, as well as any combination thereof.

Figure 1:
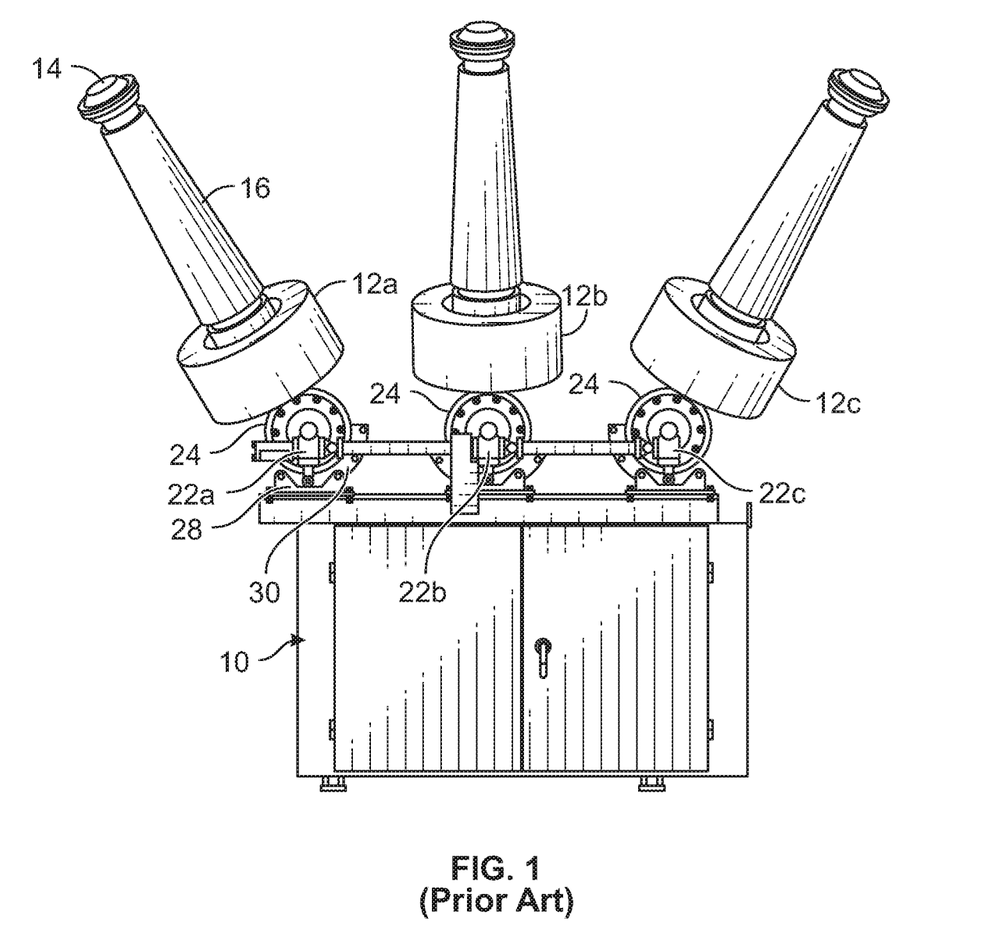
FIG. 1 illustrates a front view of a conventional high voltage dead tank circuit breaker.
Figure 2:
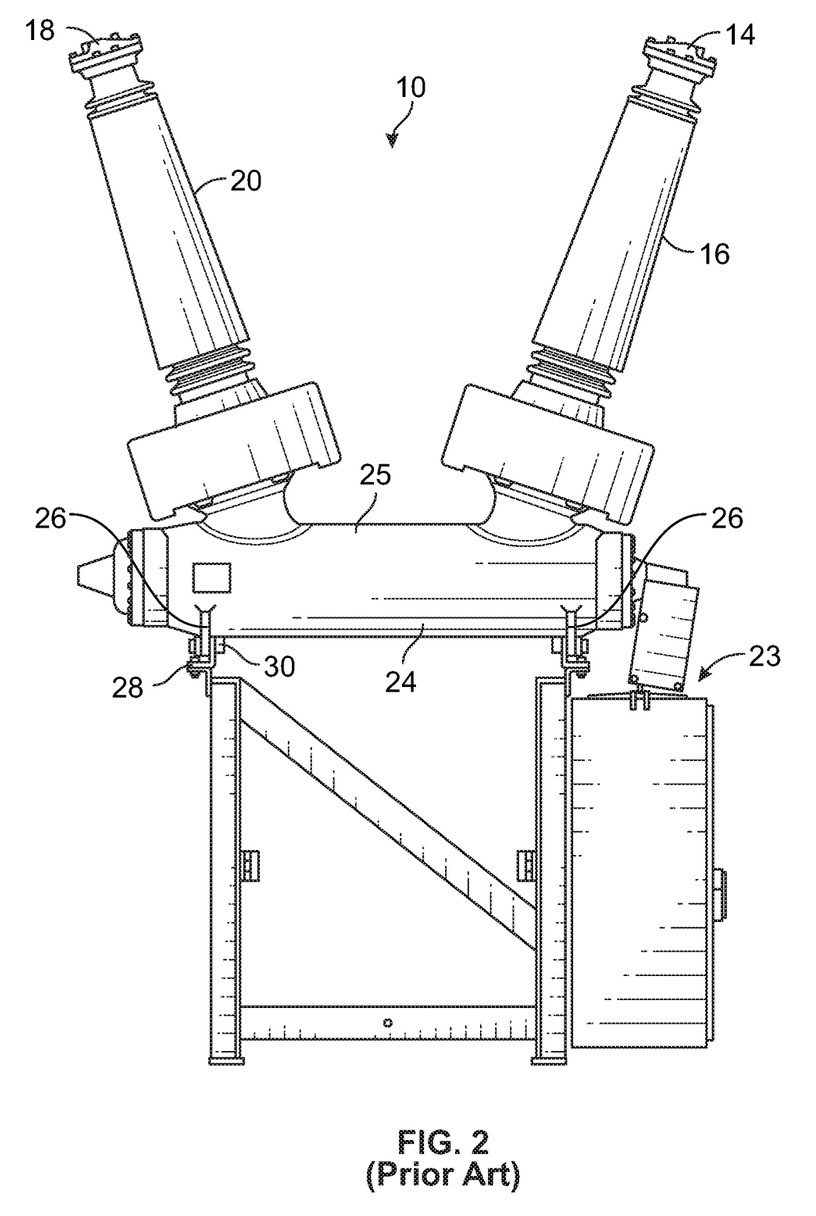
FIG. 2 illustrates a side view of the conventional circuit breaker of FIG. 1.

For purposes of illustration, FIGS. 1 and 2 depict a conventional dead tank circuit breaker, generally indicated at 10. According to the illustrated example, the circuit breaker 10 is a three-phase circuit breaker, and thus includes three pole assemblies including outer pole assemblies 12a, 12c and a central pole assembly 12b. Each pole assembly 12a, 12b, 12c includes a first electrical conductor 14 carried in a first bushing 16 and a second electrical conductor 18 carried in a second bushing 20. Electrical power lines are coupled to the first and second electrical conductors 14, 18, and the circuit breaker 10 selectively opens or closes the electrical connection there-between. A bell crank 22a, 22b, 22c can be associated with a respective pole assembly 12a, 12b, 12c. The bell cranks 22a, 22b, 22c can be interconnected by a gang-style linkage structure that includes interconnecting shafts so that all three poles assemblies 12a, 12b, 12c are actuated at the same time by a single operating mechanism, generally indicated at 23. Each pole assembly 12a, 12b, 12c can include an enclosure 24, which in this example is a dead tank, that can house the electrical contacts of the breaker 10, including, for example, one or more circuit interrupters. As shown in the illustrated example, each enclosure 24 includes a plurality of feet 26a, 26b that are each fixed to a support structure 28 by conventional bolts 30. The feet 26a, 26b can a provide support(s) from which the enclosure 24, among other components of the circuit breaker 10, can be supported and/or stand.

The interior area 27 of the enclosure 24 can be defined by a wall 25 of the enclosure 24. Additionally, the interior area 27 of the enclosure 24, as well as at least a portion of the entrance to the first and second bushings 16, 20, can be filled with a liquid or gaseous insulating medium 32. According to certain embodiments, the insulating medium 32 is a high pressure, electrically insulating gas, such as, for example, sulfur hexafluoride ($SF_6$), among other insulating gases. Alternatively, the insulating medium 32 is ambient or compressed air. Further, according to certain embodiments, the insulating medium can be a liquid, such as, for example, oil, among other liquid insulating mediums. The electrically insulating medium 32 can be utilized for a variety of different purposes. For example, contacts within the enclosure 24 can be subject to arcing or corona discharge during operation of the circuit breaker 10, such as, for example, as a moveable contact of a circuit interrupter of the circuit breaker 10 is displaced from an electrically closed position to an open position relative to a stationary electrical contact of the circuit interrupter. Such arcing can cause the moveable and/or stationary contact to erode and disintegrate over time. Accordingly, the insulating medium 32 can be utilized to quench such arcing. Further, given the properties of the insulating medium 32, the insulating medium 32 can also act as an insulator between conductive parts within enclosure 24 and the wall 25 of the enclosure 24, among other electrically conductive parts or components of the circuit breaker 10.

Figure 5A:
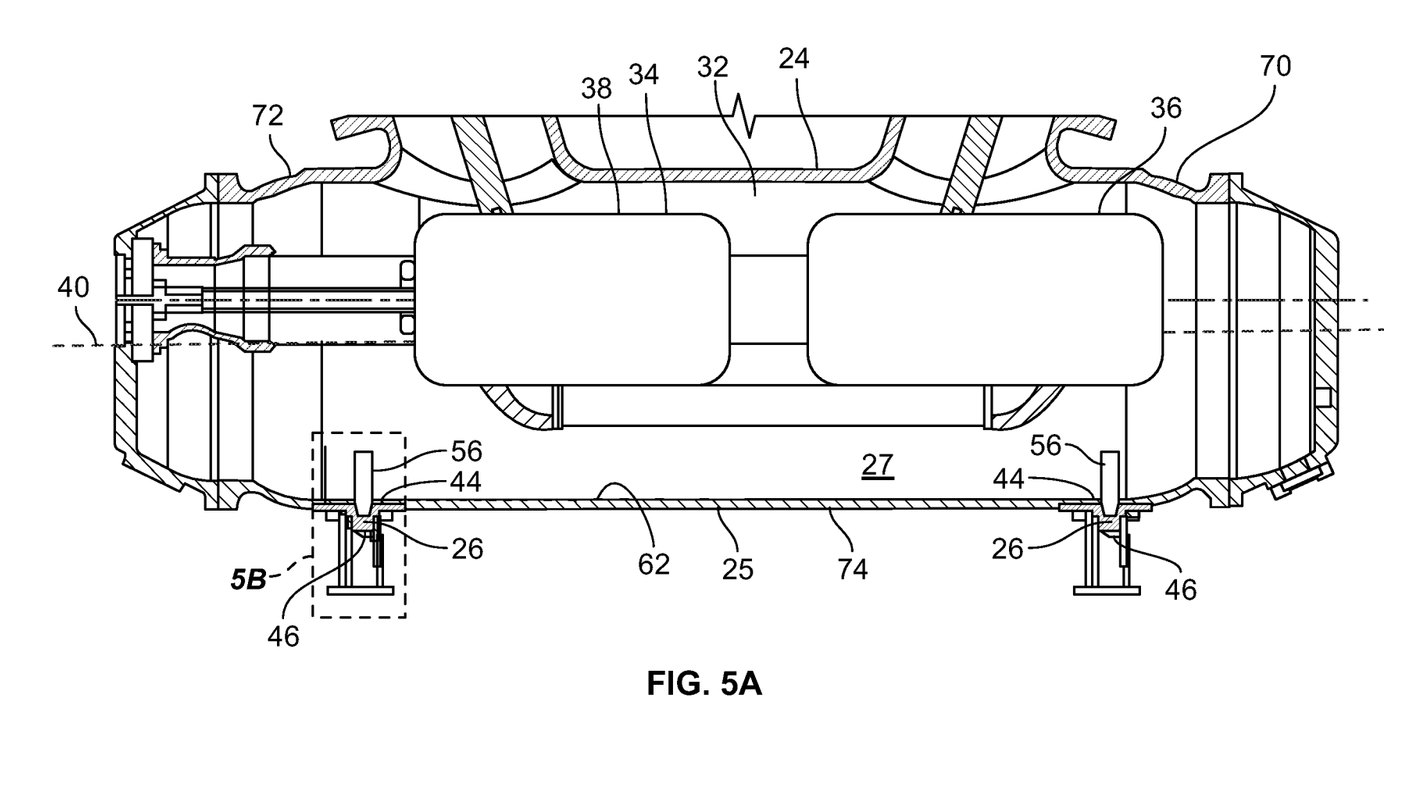
FIG. 5A illustrates a cross sectional view of a portion of a sealed enclosure for a circuit breaker having particle traps integrated into feet of the enclosure according to an illustrated embodiment of the subject application.

Referencing FIG. 5A, a variety of different types or styles of circuit interrupters 34 can be at least partially housed in the interior area 27 of the sealed enclosure 24. Often, a typical circuit interrupter 34 that can be housed in the interior area 27 of the enclosure 24 can include stationary and movable contact assemblies 36, 38. According to such an embodiment, the contact of the circuit breaker 10 can generally comprise the contacts of the stationary and movable contact assemblies 36, 38. The stationary contact assembly 36 can be electrically coupled to the first electrical conductor 16, while the movable contact assembly 38 can be electrically coupled to the second contact conductor 18. Additionally, according to certain embodiments, an insulator tube 40 can extend between the stationary and moveable contact assemblies 36, 38. During operation of the circuit interrupter 34, an operating rod can operate to displace one or more movable contacts of the moveable contact assembly 38 relative to one or more stationary contacts of the stationary contact assembly 36 such that the contact of the circuit breaker 10 is displaced between an electrically open position and a closed position.

Figure 3:
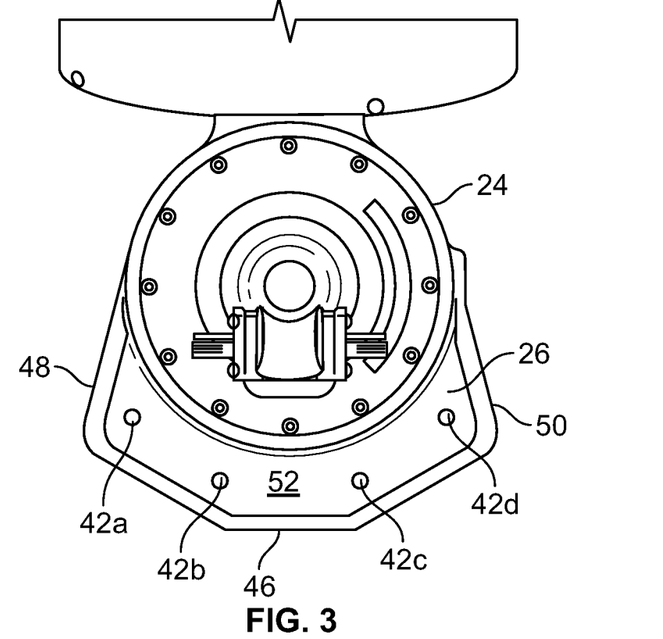
FIG. 3 illustrates a front side view of a sealed enclosure for a circuit breaker having an integrated foot that extends around a portion of the enclosure.
Figure 4:
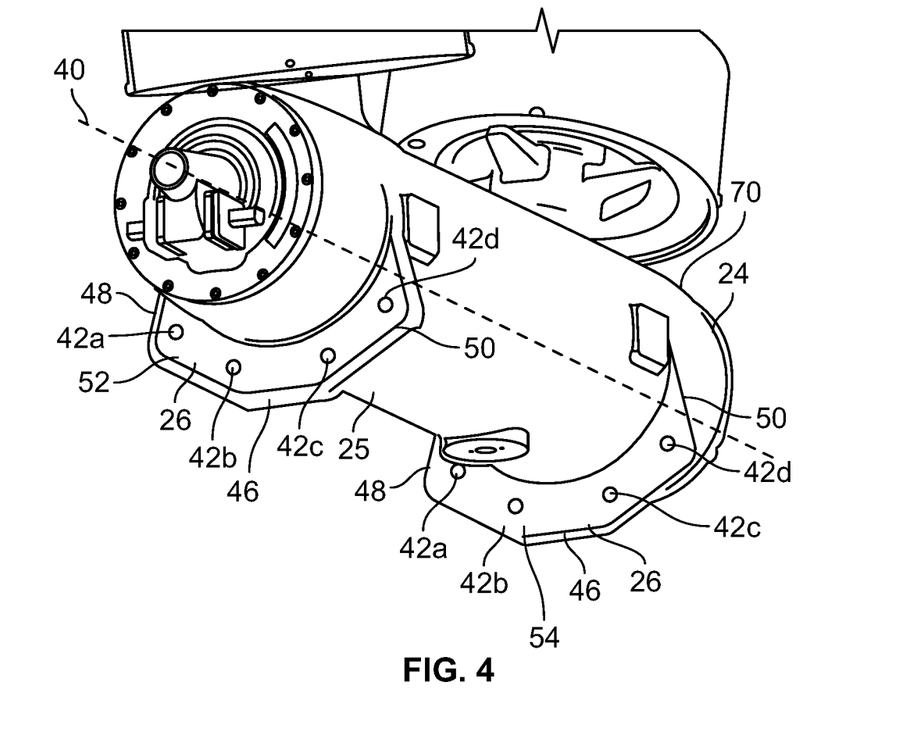
FIG. 4 illustrates a bottom side perspective view of a sealed enclosure for a circuit breaker having integrated feet that extend around a portion of the enclosure.

As shown in at least FIGS. 3 and 4, the feet 26a, 26b of the enclosure 24 that are used for mounting at least the enclosure 24, if not the entire associated pole assembly 12a, 12b, 12c, to the support structure 28 can be integrated into the enclosure 24 such that the feet 26a, 26b and the enclosure 24 area unitary or monolithic structure. The location, number, and configuration of the feet 26a, 26b for the enclosure 24 can vary for different types, and/or configurations, of enclosures 24. For example, while FIGS. 1 and 2 depict an enclosure 24 in the form of an exemplary dead circuit tank that has two feet 26a, 26b, embodiments of the subject application can also be used with enclosures for other types of circuit breakers, including, for example, live circuit tanks, as well as with enclosures having different various types of foot configurations and/or arrangements. Additionally, while the illustrated embodiment depicts horizontally mounted enclosures, according to other embodiments, the feet can be used with vertically mounted sealed enclosures for circuit breakers. Additionally, while the illustrated embodiment depicts an enclosure 24 having two feet 26a, 26b, the number of feet can vary, including, for example, having more than two feet.

FIGS. 3 and 4 depict feet 26a, 26b that radially extend around a portion of an outer circumference of the wall 25 of the enclosure 24. As shown, the feet 26a, 26b radially extend around the wall of the enclosure 24 so as to provide the feet 26a, 26b with a generally semi-circular front side profile. For example, according to certain embodiments, the feet 26a, 26b can each extend around 60° to around 160°, and more specifically around 120°, about the outer circumference of the wall 25 of the enclosure 24. Such a configuration of the feet 26a, 26b, can facilitate the enclosure 24 being mounted in a variety of angular orientations relative to a central longitudinal axis 40 (FIG. 4) of the enclosure 24. For example, referencing FIG. 1, the enclosure 24 for each pole assembly 12a, 12b, 12c may be mounted at a different angular orientation relative to the adjacent enclosure(s) 24 so as to accommodate the positioning and/or clearance of various components or assemblies of each circuit breaker 10, including, for example, the positioning and/or clearance for at least the first and second electrical connectors 14, 18 of each adjacent pole assembly 12a, 12b, 12c, among other space and clearance considerations. Such variation in mounted angular orientations of the enclosures 24 can be facilitated by the feet 26a, 26b having mounting holes 42a-d at a variety of different locations, as shown in FIGS. 3 and 4, that can be selectively used for mounting the enclosures 24, and their respective associated pole assemblies 12a, 12b, 12c, to an associated support structure 28. Thus, for example, a first enclosure 24 can be fixed to the support structure 28 by bolts 30 that extend through a first pair of mounting holes 42a-b, while an second, adjacent enclosure 24 can be fixed to the support structure 28 by bolts 30 that extend through a second pair of mounting holes 42b-c such that at least the enclosures 24 of adjacent pole assemblies 12a, 12b, among other components of the circuit breaker 10, are at different angular orientations.

Referencing FIGS. 3-5B, each foot 26a, 26b vertically extends between a top side 44 and a bottom side 46 of the foot 26a, 26b. Additionally, the feet 26a, 26b generally radially extend between a first edge 48 and a second edge 50, and having opposing front and rear sides 52, 54. According to the illustrated embodiment, the bottom side 46, first edge 48, second edge 50, front side 52, and rear side 54 are external to an interior area 27 of the enclosure 24. Additionally, according to the illustrated embodiment, the first and second edges 48, 50 extend between the front and rear sides 52, 54 of the feet 26a, 26b in a direction that can be generally parallel to direction that the mounting holes 42a-d extend through the front and rear sides 52, 54 of the feet 26a, 26b. Further, according to certain embodiments, the top side 44 of each foot 26a, 26b can be formed along a portion of the inner side 62 of the wall 25 of the enclosure 24 that can generally define the interior area 27 of the enclosure 24. Alternatively, the top side 44 of each foot 26a, 26b can be located at a location at which the foot 26a, 26b is connected to the wall 25 of the enclosure 24.

Figure 5B:
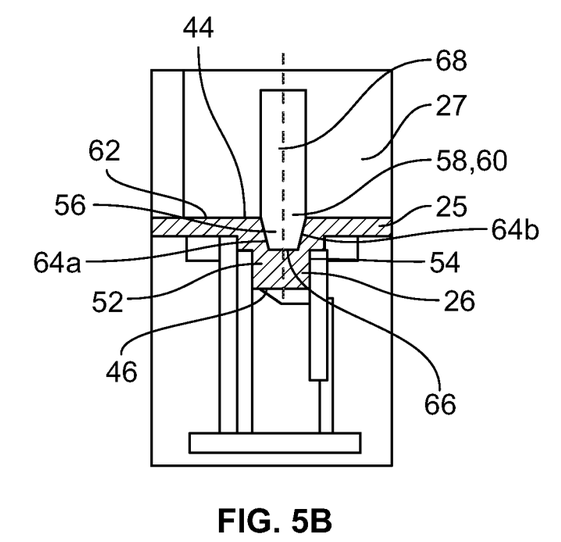
FIG. 5B illustrates an enlarged view of the area labeled 5B in FIG. 5A, and depicts a cross sectional view of a particle trap integrated into a foot of the enclosure.

As shown in at least FIGS. 5A and 5B, the feet 26a, 26b each include at least a portion of a particle trap 56. According to the illustrated embodiment, each particle trap 56 can be a trough that extends outwardly through at least the top side 44 of the feet 26a, 26b in a general direction toward the bottom side 46 of the feet 26a, 26b. The particle traps 56 can be configured such that contaminants within the enclosure 24 can fall into the particle trap 56, such as for example, via gravity and/or vibration of at least the enclosure 24. The particle trap 56 can have a variety of different shapes and configurations. For example, according to the illustrated embodiment, the particle trap 56 can include an opening 58 that extends to a first end 60 of the particle trap 56 that is generally co-planar with the inner side 62 of the wall 25 of the enclosure 24 that generally defines the interior area 27 of the enclosure 24. According to certain embodiments, the opening 58 can be formed in, and extend through, the inner side 62 of the wall 25 of the enclosure 24 and/or through a top side 44 of the foot 26a, 26b. The opening 58 can further be defined by opposing first and second sidewalls 64a, 64b of the particle trap 56 that extend from the first end 60, through the wall 25 and foot 26a, 26b to a second, closed end 66 of the particle trap 56 that is located within the foot 26a, 26b. According to the illustrated embodiment, at least a portion, if not all, of the first and second sidewalls 64a, 64b, can be inwardly tapered from the first end 60 to the second end 66 of the particle trap 56 such that a width of the opening 58 between the first and second sidewalls 64a, 64b at the top end 60 of the particle trap 56 is generally larger than a width of the opening 58 between the first and second sidewalls 64a, 64b at the second end 66 of the particle trap 56.

The width of the particle trap 56, such as, for example, a width of the opening 58 of the particle trap 56 between the first and second sidewalls 64a, 64b, can be sized so as to collect, as well as maintain, contaminants within the particle trap 56 while also attempting to minimize the strength of the electrical field that may extend into the particle trap 56. For example, according to certain embodiments, the opening 58 of the particle trap 56 can have a width of around one inches to around three inches, and more specifically, around one and a half inches. Similarly, the depth of the opening 58 of the particle trap 56 in a generally outward direction between the first end 60 to the second end 66 of the particle trap 56 can be around two inches to around four inches. Additionally, as indicated by at least FIG. 5B, according to certain embodiments, the particle trap 56 can generally be centered about a centerline 68 of the foot 26. However, the size, as well as the configuration of the particle trap 56, can be based on a variety of factors, including, for example, voltage that may flow through the circuit interrupter 34 and the ratio of sizes, such as, for example, diameter, of the enclosure 24 to the circuit interrupter 34.

Figure 6:
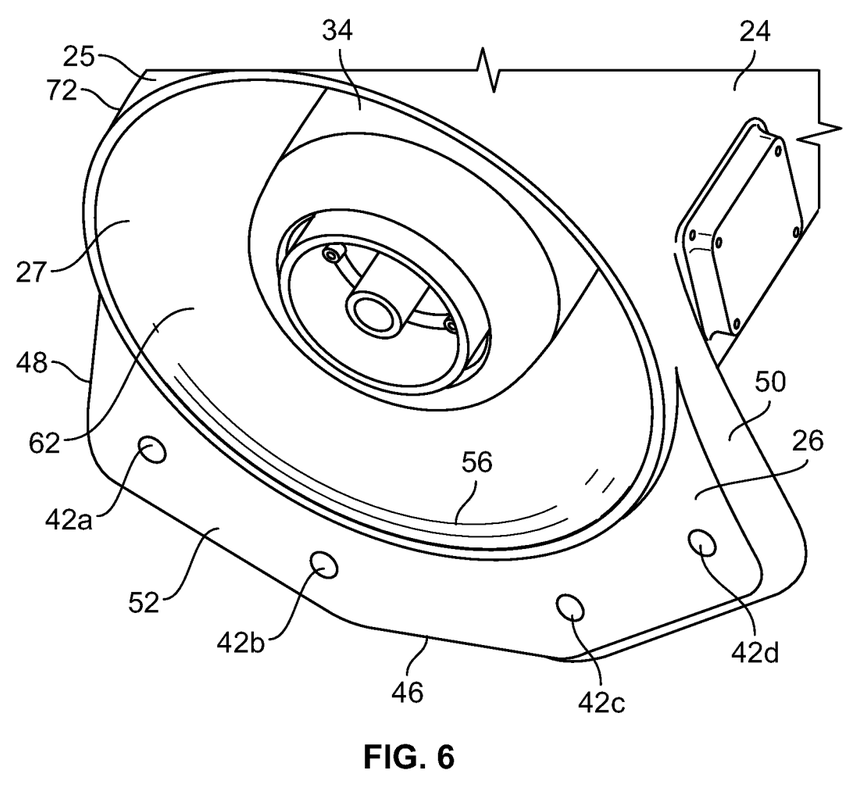
FIG. 6 illustrates a top side partial cutaway perspective view of a sealed enclosure for a circuit breaker having a particle trap integrated into a foot of the enclosure.

As shown in FIG. 6, the opening 58 of the particle trap 56 can generally extend radially around the inner side 62 of the wall 25 of the enclosure 24 and within the feet 26a, 26b from a first side 76 to a second side 78 of the particle trap 56. Moreover, the particle trap 56 can generally radially extend about the inner side 62 of the wall 25 and within at least a portion of the feet 26a, 26b along a distance that generally corresponds to the length of the foot 26a, 26b at a location at which the foot 26 extends from, or is otherwise adjoined to, the enclosure 24. According to certain embodiments, the opening 58 of the particle trap 56 radially extends about 12 inches from the first side 76 to the second side 78 of the particle trap 56.

According to the illustrated embodiment, the enclosure 24 includes a first foot 26a generally in relative proximity to the first end 70 of the enclosure 24 and a second foot 26b in relative proximity to a second end 72 of the enclosure 24. Further, as previously discussed, at least one of the first and second feet 26a, 26b can include the integrated particle trap 56. According to such an embodiment, the enclosure 24 does not include a particle trap in a generally central portion of the enclosure 24 between the first and second feet 26a, 26b. Such an embodiment may therefore not include the corresponding outwardly extending protrusion along the outer side of the wall 25 of the enclosure 24 that is typically associated with such a centrally located particle traps. Moreover, in the absence of such a centrally located particle trap, and the associated outwardly directed projection of the wall 25 of the enclosure 24, the wall 25 of the enclosure 24 of the subject application can be devoid of projections between the feet 26a, 26b of the enclosure 24 that could otherwise interfere with the with the placement of an external heater, or other element or component, between the first and second feet 26a, 26b. Such a configuration can thus increase the outer surface area of the enclosure 24 that is available for use with an external heater. Further, by integrating the particle traps 56 into the structure of the feet 26a, 26b, the inclusion of traditional additional strengthening features for the particle trap 56 in the enclosure 24 can be avoided, which can assist in simplifying the geometry of the enclosure 24 and thus can improve the ease with which the enclosures 24 can be manufactured.

While the invention has been described in connection with what is presently considered to be the most practical and preferred embodiment, it is to be understood that the invention is not to be limited to the disclosed embodiment (s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

The invention claimed is:

1. An apparatus comprising:
    an enclosure having a wall and a plurality of feet, the wall having an inner side that generally defines an interior region of the enclosure, the plurality of feet extending outwardly from, and radially about, at least a portion of the wall; and
    a particle trap having an opening in at least one foot of the plurality of feet that (i) outwardly extends between a first end and a second end of the particle trap, and (ii) radially extends between a first side and a second side of the particle trap, wherein the first end of the particle trap is at the inner side of the wall of the enclosure and the second end of the particle trap is within the at least one foot,
    wherein the plurality of feet each include a plurality of mounting holes.

2. The apparatus of claim 1, wherein the particle trap is aligned with a central axis of the at least one foot.

3. The apparatus of claim 1, wherein the particle trap includes a first sidewall and a second sidewall, the first and second sidewalls defining at least a portion of the opening and inwardly extend from the first end to the second end of the particle trap.

4. The apparatus of claim 1, wherein the opening has a width of around one and a half inches and a depth of around two inches to around four inches.

5. The apparatus of claim 1, wherein the particle trap comprises a plurality of particle traps, and wherein each of the plurality of feet have one of the plurality of particle traps.

6. The apparatus of claim 1, wherein the enclosure is a sealed enclosure that is configured to house a dielectric insulating medium within the interior region of the enclosure.

7. The apparatus of claim 6, further including a contact interrupter housed within the interior region of the enclosure.

8. The apparatus of claim 1, wherein the plurality of feet are formed integrally with the enclosure.

9. The apparatus of claim 1, wherein the plurality of feet and the enclosure are a unitary or monolithic structure.

10. An apparatus comprising:
    an enclosure having a wall and a plurality of feet, the wall having an inner side that generally defines an interior region of the enclosure, the plurality of feet extending outwardly from, and radially about, at least a portion of the wall; and
    wherein each foot of the plurality of feet includes a particle trap, each of the particle traps having an opening that (i) extends through the wall of the enclosure and into the foot such that the opening is in fluid communication with the interior region of the enclosure, and (ii) radially extends within both the wall and the foot between a first side and a second side of the particle trap,
    wherein the plurality of feet each include a plurality of mounting holes.

11. The apparatus of claim 10, wherein the particle trap is aligned with a central axis of the foot into which the particle trap extends.

12. The apparatus of claim 10, wherein the particle trap includes a first sidewall and a second sidewall, the first and second sidewalls defining at least a portion of the opening and inwardly extend from inner side of the wall to a closed end of the particle trap within the foot.

13. The apparatus of claim 10, wherein the opening has a width of around one and a half inches and a depth of around two inches to around four inches.

14. The apparatus of claim 10, wherein the enclosure is a sealed enclosure that is configured to house a dielectric insulating medium within the interior region of the enclosure.

15. The apparatus of claim 10, further including a contact interrupter housed within the interior region of the enclosure.

16. A circuit breaker comprising:
at least one pole assembly having a first electrical conductor, a second electrical conductor,
an enclosure, and a circuit interrupter,
wherein the enclosure includes a wall and a plurality of feet, the wall having an inner side that defines an interior region of the enclosure,
wherein the circuit interrupter is housed within the interior region of the enclosure, and
wherein each foot of the plurality of feet includes a particle trap, the particle trap having an opening that (i) extends through the wall of the enclosure and into the foot such that the opening is in fluid communication with the interior region of the enclosure, and (ii) radially extends within both the wall and the foot between a first side and a second side of the particle trap,
wherein the plurality of feet each include a plurality of mounting holes.

17. The circuit breaker of claim 16, wherein the particle trap is aligned with a central axis of the foot into which the particle trap extends.

18. The circuit breaker of claim 16, wherein the particle trap includes a first sidewall and a second sidewall, the first and second sidewalls defining at least a portion of the opening and inwardly extend from the inner side the wall to a closed end of the particle trap within the foot.

19. The circuit breaker of claim 16, wherein the enclosure is a sealed enclosure that is configured to house a dielectric insulating medium within the interior region of the enclosure.

* * * * *